(12) United States Patent
Sauve et al.

(10) Patent No.: US 8,631,341 B2
(45) Date of Patent: *Jan. 14, 2014

(54) SYSTEM AND METHOD FOR SELECTING A TAB WITHIN A TABBED BROWSER

(75) Inventors: Aaron J. Sauve, Seattle, WA (US); Cornelis K. Van Dok, Bellevue, WA (US); Donald J. Lindsay, Mountain View, CA (US); Tony E. Schreiner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

This patent is subject to a terminal disclaimer.

(21) Appl. No.: 12/564,705

(22) Filed: Sep. 22, 2009

(65) Prior Publication Data

US 2010/0011313 A1    Jan. 14, 2010

Related U.S. Application Data

(63) Continuation of application No. 11/101,735, filed on Apr. 7, 2005, now Pat. No. 7,596,760.

(51) Int. Cl.
*G06F 3/048* (2006.01)

(52) U.S. Cl.
USPC ........... 715/777; 715/776; 715/781; 715/783; 715/788

(58) Field of Classification Search
USPC .......... 715/777, 781, 783, 788, 776, 273, 200
See application file for complete search history.

(56) References Cited

U.S. PATENT DOCUMENTS

| | | | |
|---|---|---|---|
| 5,781,785 A * | 7/1998 | Rowe et al. | 715/234 |
| 5,949,413 A | 9/1999 | Lerissa et al. | 715/733 |
| 6,247,020 B1 | 6/2001 | Minard | 1/1 |
| 6,356,908 B1 | 3/2002 | Brown et al. | 707/10 |

(Continued)

FOREIGN PATENT DOCUMENTS

| | | |
|---|---|---|
| CN | 1529262 A | 9/2004 |
| GB | 2360921 | 10/2001 |

(Continued)

OTHER PUBLICATIONS

Jhaveri, "Intermediate and Post-Session Web Page Revisitation Techniques and Tools," Sep. 2004, pp. 59.

(Continued)

*Primary Examiner* — Ting Lee
(74) *Attorney, Agent, or Firm* — Merchant & Gould

(57) ABSTRACT

The techniques and mechanisms described herein are directed to a method for managing and selecting one out of large set of open tabs in a tabbed browser. Browsing software is configured to provide a quick pick user-interface that visually displays the content of the several tabs, such as a by displaying a thumbnail for each tab. The thumbnails allow a user to easily distinguish between each opened tab. The browsing software may also be configured to recognize a user selection from within the quick pick user-interface and in response, switch back to a tabbed window view and display the selected tab in that view. The browsing software may adjust the tab row so that the selected tab is positioned in a favorable position within the tab row. In addition, within the quick pick user-interface, the user may reposition the thumbnails and/or close the thumbnails, thus affecting the associated tab in the tab row.

20 Claims, 10 Drawing Sheets

(56) References Cited

U.S. PATENT DOCUMENTS

| | | | |
|---|---|---|---|
| 6,359,634 B1 | 3/2002 | Cragun et al. | 715/777 |
| 6,433,801 B1 | 8/2002 | Moon et al. | 715/840 |
| 6,456,303 B1 | 9/2002 | Walden et al. | 715/705 |
| 6,489,975 B1 | 12/2002 | Patil et al. | 715/781 |
| 6,544,295 B1 | 4/2003 | Bodnar | |
| 6,801,227 B2 | 10/2004 | Bocionek et al. | 715/777 |
| 6,981,223 B2 | 12/2005 | Becker et al. | 715/753 |
| 7,207,003 B1 | 4/2007 | Berstis et al. | |
| 7,234,114 B2 | 6/2007 | Kurtz et al. | |
| 7,251,775 B1 | 7/2007 | Astala et al. | |
| 7,596,760 B2 | 9/2009 | Sauve et al. | |
| 7,624,348 B2 | 11/2009 | Shuping et al. | |
| 2002/0093537 A1 | 7/2002 | Bocioned et al. | |
| 2002/0163545 A1 | 11/2002 | Hii | 345/838 |
| 2002/0194611 A1 | 12/2002 | Hodgkinson | |
| 2003/0071849 A1 | 4/2003 | Ferri | 345/777 |
| 2003/0097640 A1 | 5/2003 | Abrams et al. | 715/530 |
| 2003/0222916 A1 | 12/2003 | Kuwata et al. | 245/777 |
| 2004/0030719 A1 | 2/2004 | Wei | 707/104.1 |
| 2004/0041841 A1 | 3/2004 | LeMogne et al. | |
| 2004/0093562 A1 | 5/2004 | Diorio et al. | 715/513 |
| 2004/0113948 A1 | 6/2004 | Shahrbabaki et al. | 345/777 |
| 2004/0215649 A1 | 10/2004 | Whalen et al. | 707/102 |
| 2005/0015726 A1 | 1/2005 | Tuominen | 715/733 |
| 2005/0172235 A1 | 8/2005 | Cragun et al. | 715/744 |
| 2006/0101330 A1 | 5/2006 | Godley | |
| 2006/0161857 A1 | 7/2006 | Johnston et al. | 715/777 |
| 2007/0128899 A1 | 6/2007 | Mayer | 439/152 |

FOREIGN PATENT DOCUMENTS

| | | | |
|---|---|---|---|
| JP | 2003223250 A | 8/2003 | |
| JP | 2004145375 A | 5/2004 | |
| RU | 2003112728 A | 12/2004 | |
| RU | 2004119851 A | 3/2005 | |
| TW | 448377 B | 8/2001 | |
| TW | 518487 B | 1/2003 | |
| WO | 2004107151 A | 12/2004 | |

OTHER PUBLICATIONS

Siracusa, "OmniWeb 5.0 Beta," at <<http://arstechnica.com/reviews/appsfow5.ars/1>>, Feb. 3, 2004, pp. 22.

PCT Search Report Patent Application No. PCT/US06/08415 Mailed on Oct. 1, 2007, pp. 7.

"Tabbrowser Preferences—Firefox Extension," found on internet at https://addons.mozilla.org/extensions/moreinfo.php?id=158&application=firefox on Jan. 25, 2006, 8 pages.

"Maxthon Tabbed Browser," found on internet at http://www.maxthon.com/ on Jan. 25, 2006, 3 pages.

"Netscape 7.1 Highlights," found on internet http://channels.netscape.com/browsers/7/learnmore/NS71_reviewersguide.pdf, 46 pages, 2003.

"Opera for Windows," found on internet at http://www.opera.com/products/desktop/ on Jan. 25. 2006, 4 pages.

Notice of Allowance issued Aug. 29, 2011, in Malaysia Patent Application No. PI 20060945, filed Mar. 7, 2006.

Office Action mailed Aug. 12, 2010 in co-pending Australia Application No. 2006234871, filed Mar. 9, 2006.

Office Action mailed Nov. 15, 2011 in co-pending Australia Application No. 2011201522, filed Apr. 5, 2011.

Notice of Allowance mailed Feb. 21, 2012 in co-pending Australia Application No. 2011201522, filed Apr. 5, 2011.

Notice of Allowance mailed Jun. 26, 2012 in co-pending Canada Application No. 2,602,600 filed Mar. 9, 2006.

Office Action mailed Jan. 22, 2010 in co-pending China Application No. 200680011149.3, filed Mar. 9, 2006 (with English-language translation).

Notice of Allowance mailed Dec. 28, 2011 in co-pending China Application No. 200680011149.3, filed Mar. 9, 2006 (with English-language translation).

Office Action mailed Sep. 22, 2011 in co-pending Japan Application No. 2008-505313, filed Mar. 9, 2006 (with English-language translation).

Notice of Allowance mailed Mar. 9, 2010 in co-pending Mexico Application No. MXa/2007/012422, filed Mar. 9, 2006.

Gagne, Marcel, "Moving to Linux: Kiss The Blue Screen of Death Goodbye!" 2004, Chapter 4, pp. 24, 169 and 172, found in Internet http://books.google.ru/books, 3 pages.

Notice of Allowance mailed Aug. 27, 2012 in co-pending Japan Application No. 2008-505313, filed Mar. 9, 2006.

Notice of Allowance mailed Dec. 15, 2010 in co-pending Australia Application No. 2006234871, filed Mar. 9, 2006.

Notice of Preliminary Rejection mailed Aug. 17, 2012 in co-pending Korean Application No. 10-2011-7005286, filed Mar. 4, 2011 (with English-language translation).

Notice of Allowance mailed Sep. 12, 2012 in co-pending Taiwan Application No. 95104450, filed Feb. 9, 2006.

Michel Beaudouin-Lafon, Novel Interaction Techniques for Overlapping Windows, Proceedings: Proceedings of the 14th annual ACM symposium on User interface software and technology.—Published Date: Nov. 11, 2011. http://wiki.lri.fr/fondihm/_files/windows-uist01-beaudouinlafon.pdf.

Cockburn, et al., "WebView: A Graphical Aid for Revisiting Web Pages," In Proceedings of the Australian Conference on Human Computer Interaction, Nov. 28, 1999, 7 pages.

* cited by examiner

SYSTEM AND METHOD FOR SELECTING A TAB WITHIN A TABBED BROWSER

CROSS-REFERENCE TO RELATED APPLICATIONS

This application is a continuation of and claims the benefit of U.S. patent application Ser. No. 11/101,735, filed on Apr. 7, 2005, and entitled "SYSTEM AND METHOD FOR SELECTING A TAB WITHIN A TABBED BROWSER", the disclosure of which is hereby incorporated by reference herein in its entirety.

TECHNICAL FIELD

This document generally relates to browsing software, and more particularly, to tabbed-browsing software.

BACKGROUND

Browsing the World Wide Web (the web), the graphical portion of the Internet, has become quite popular in recent years. A software program, commonly referred to as a web browser, or just browser, provides an easy-to-use point-and-click interface for accessing various content on the web. Upon entering a web address or URL of a particular website, the browser requests web pages from a web server hosting that website. The browser then interprets the web pages and displays the content on a display. The web pages include hypertext and hyperlinks that, when selected, cause the browser to request additional content associated with them. By selecting the hypertext and hyperlinks, a user may conveniently navigate through pages of information—commonly known as browsing or surfing the Internet.

Each time one of the hypertext or hyperlinks is selected, the new content is downloaded into the current window. Depending on the network bandwidth, this may cause a brief to extensive delay. For convenience, additional windows may be opened to view multiple web pages. However, after opening several web pages, each in its own window, the taskbar may become quite cluttered. This makes it difficult to re-locate a particular web page. Tabbed browsers have been introduced to help manage the viewing of multiple web pages.

Tabbed browsers load web pages in "tabs" within the same browser window. Therefore, only one item appears on the taskbar, even though multiple web pages are loaded. New tabs may be opened via a hotkey, a context menu item on a link or the like. The new web page downloads in the background into the new tab. This allows a user to continue viewing the current web page without automatically switching to the other web page. At any time, the user may click on the associated tab and view that web page. Tabbed browsing makes it easier and more convenient to view multiple web pages. However, when multiple tabs are open, users may experience difficulty switching between them.

The present mechanism further enhances the tabbed-browsing experience, especially with selecting one out of a large set of open tabs.

SUMMARY

The techniques and mechanisms described herein are directed to a method for managing and selecting one out of several open tabs in a tabbed browser. Briefly stated, browsing software is configured to provide a quick pick user-interface that visually displays the several tabs. The quick pick user-interface displays a rich set of information for each tab, such as a thumbnail, meta-data describing each tab (e.g., title) and/or other adornments. The thumbnails allow a user to easily distinguish between each opened tab. The browsing software may also be configured to recognize a user selection from within the quick pick user-interface and in response, switch back to the tabbed window view and display the selected tab in that view. The browsing software may adjust the tab row so that the selected tab is positioned in a favorable position within the tab row. In addition, within the quick pick user-interface, the user may reposition the thumbnails and/or close the thumbnails, thus affecting the associated tab in the tab row.

BRIEF DESCRIPTION OF THE DRAWINGS

Non-limiting and non-exhaustive embodiments are described with reference to the following figures, wherein like reference numerals refer to like parts through-out the various views unless otherwise specified.

DETAILED DESCRIPTION

Briefly, the techniques and mechanisms described herein are directed to managing and selecting one out of a large set of open tabs within a tabbed window displayed by a browser. A quick pick user-interface is provided that visually displays a rich set of information, such as thumbnails, meta-data describing each tab (e.g., title) and the like. The thumbnails may be selected and/or moved within the quick pick user-interface. Upon switching back to the tabbed window view, the tab row and the contents of the tabbed window are modified based on the interactions that occurred in the quick pick user interface. The following discussion describes the quick pick mechanism within a tabbed browser that supports tabbed-heterogeneous windows. However, after reading the following description, one skilled in the art could incorporate the quick pick mechanism into other types of tabbed browsers. As will be described in more detail below, the present quick pick mechanism provides a convenience that was unavailable until now.

Exemplary Computing Environment

Figure 1:
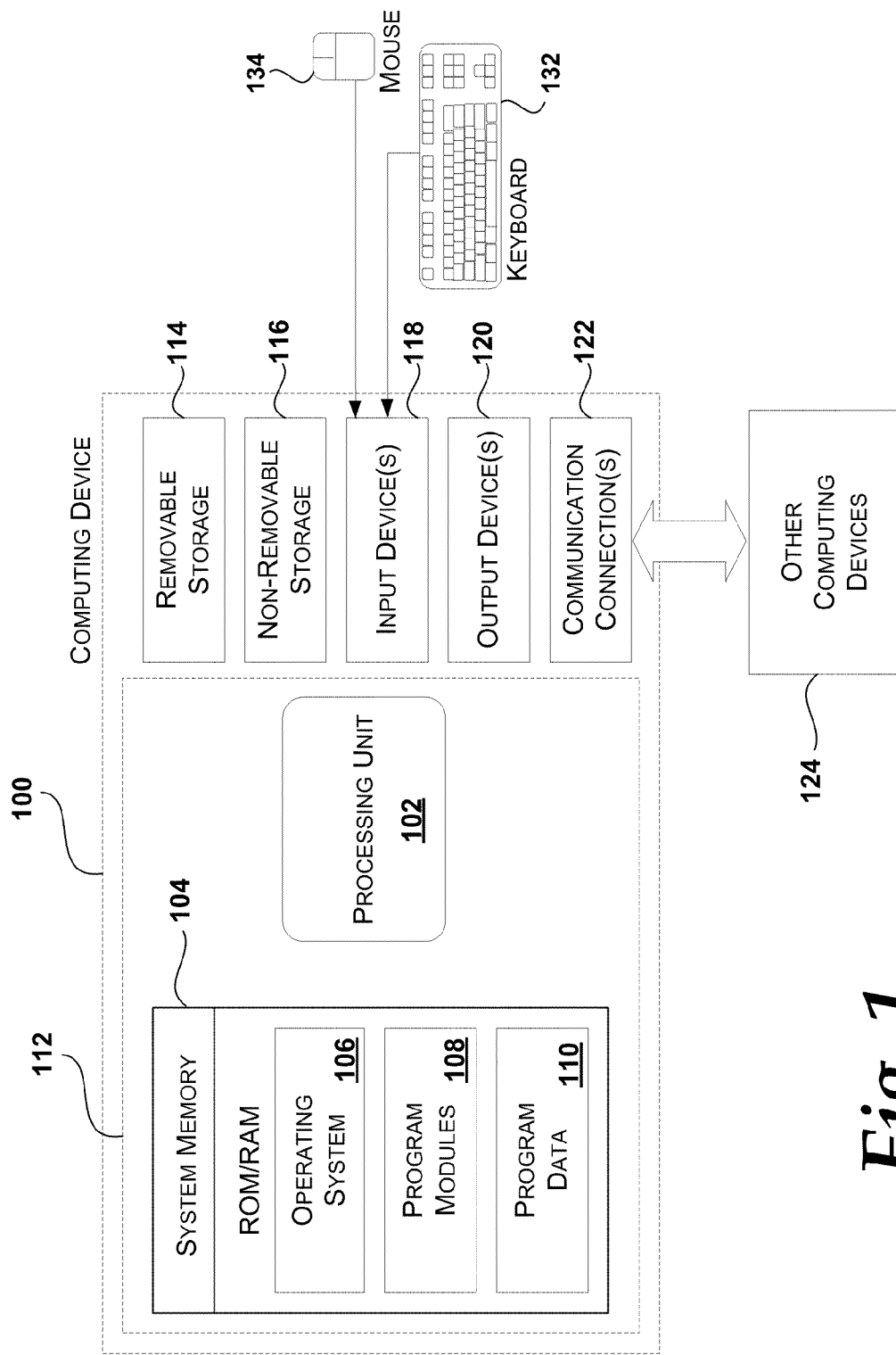
FIG. 1 is an illustrative computer environment that may be used to implement the techniques and mechanisms described herein.

The various embodiments of the quick pick mechanism may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in FIG. 1.

With reference to FIG. 1, one exemplary system for implementing a quick pick mechanism includes a computing device, such as computing device 100, In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 114 and non-removable storage 116. Computer storage media may include volatile and nonvolatile, removable and non-removable media implemented in any method or technology for storage of information, such as computer-readable instructions, data structures, program modules, or other data. System memory 104, removable storage 114 and non-removable storage 114 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 118 such as keyboard 132, mouse 134, pen, voice input device, touch input device, etc. Output device(s) 120 such as a display, speakers, printer, etc. may also be included. These devices are well know in the art and need not be discussed at length here.

Computing device 100 may also contain communication connections 122 that allow the device to communicate with other computing devices 124, such as over a network. Communication connection(s) 122 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Exemplary Architecture

Figure 2:
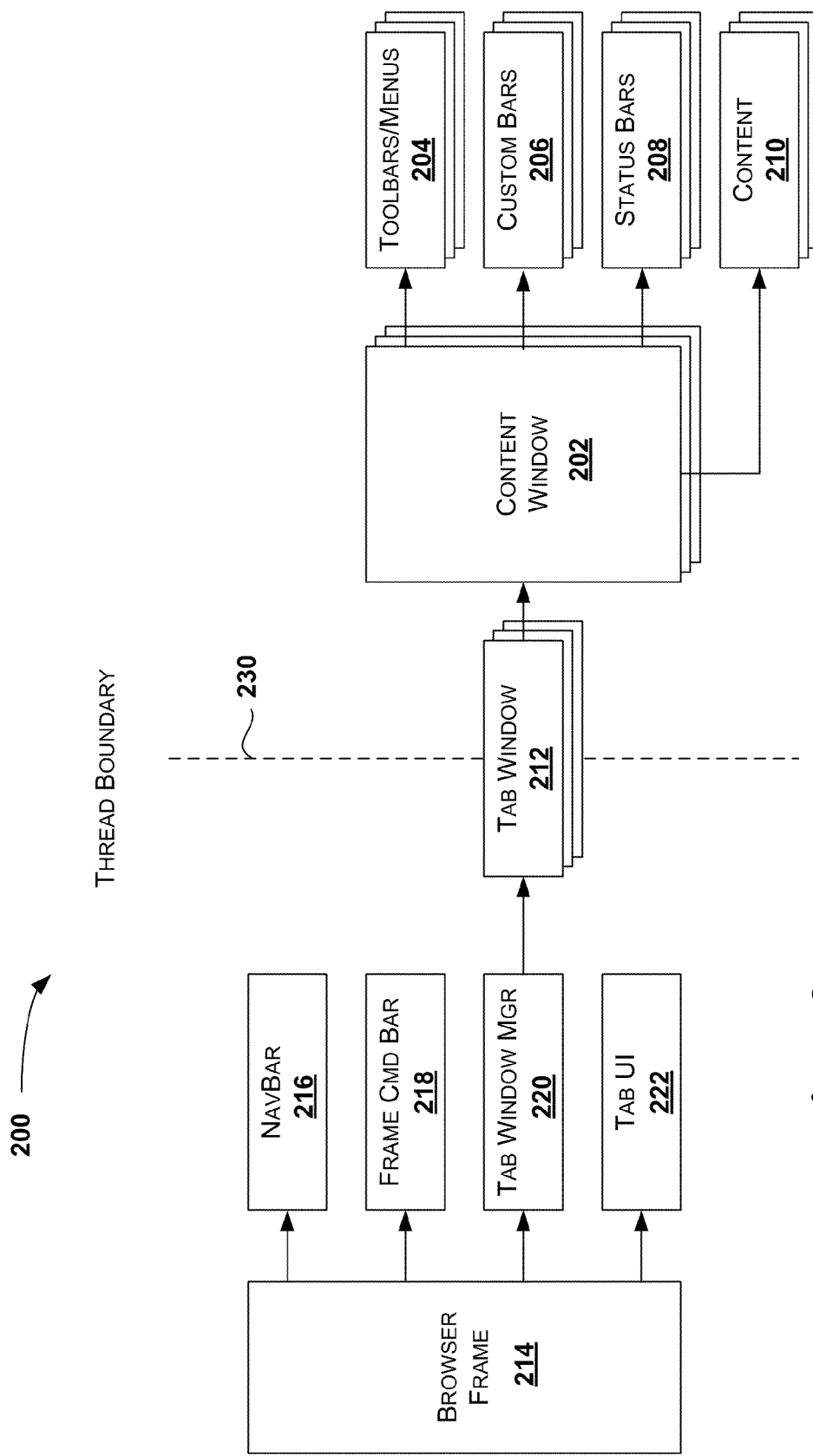
FIG. 2 is a block diagram illustrating one embodiment of an architecture for implementing tabbed browsing that provides a quick pick tab user-interface as described herein.

FIG. 2 is a block diagram illustrating one embodiment of an architecture 200 for implementing the quick-pick mechanism as described herein. Architecture 200 includes one or more content windows 202. The content window may be a web browser, a shell view, a word processing application/document, a spreadsheet application/document, a presentation application/document, a document viewer, or the like. Each content window 202 is associated with its own toolbars/menus 204, custom bars 206, status bars 208, and content 210, as needed. For example, custom bars may include bars created to operate with search engines and the like. As mentioned earlier, in traditional browsers, each browser window consumed space on a taskbar. Once a number of browser windows were opened, the taskbar became very cluttered. For the present tabbed browser, a tab window manager 220 handles all the content windows 202 via their respective tab window 212. The tab window manger 220 communicates with a browser frame 214. In addition, browser frame 214 communicates with a navigation bar 216, a frame command bar 218, and a tab user-interface 222. Each of these components will be described below in more detail after describing thread boundary 230.

Thread boundary 230 represents a boundary between a single thread (i.e., a frame thread) that handles the processing for the components shown to the left of thread boundary 230 and multiple threads that handle the processing for the components on the right of thread boundary 230. Each instance of content window 202 is associated with at least one of its own threads. That thread also handles the processing for the associated toolbars/menus 204, custom bars 206, status bars 208, and content 210.

By having multiple threads, at least one for each content window 202, the architecture prevents a potential bottleneck caused by having only one thread handle the messages for all HTML rendering across the multiple tabs. In addition, having multiple threads reduces the likelihood of unnecessary delays or timeouts when downloading web pages. Having multiple threads also makes the architecture more resilient because if a tab hangs, only one tab hangs instead of potentially hanging all of the tabs. This is in contrast with other tabbed browsers that host their tabs on a single UI thread. In these tabbed browsers, the entire application hangs when a single tab is blocked. Each individual thread may be prioritized.

Each of the components in architecture 200 is now described. As mentioned above, each content window 202 is associated with its own toolbars/menus 204, custom bars 206, status bars 208, and content 210, as needed. For example, if there are five tabs open, five instances of each add-on (e.g., custom bar, toolbar, etc) are created and hooked to their own content. Similarly, if menus or status bars are modified via internal logic, HTML, document hosting, add-ons, or the like, the menu or status bar associated with that content window 202 is changed. The add-ons and the content window 202 operate in a well know manner. Because the add-ons do not know about tabs, the architecture 200 does not modify the operation between the add-ons and the content window. Instead, the architecture wraps each set of content windows into one browser frame 214. While not shown, there may be multiple browser frames 214, each with a set of tabbed-heterogeneous windows.

Content window 202 maintains state for the content window, such as size, position, visibility of frame elements, and the like. The state may be persisted into a stream when the tabbed browser closes, and then may be read when a new content window is launched. Alternatively, the state may be saved in a registry and read from the registry when the new content window is launched.

The tab window 212 lives on the frame thread. Each tab window 212 is configured to manage communication between the outer frame components (e.g., navigation bar 216, browser frame 214, etc) and an individual tab. The tab window 212 holds pointers to its associated content window 202 and interfaces so that it can manage cross-thread communication between the outer frame components and the individual content window 202. The cross-thread communication may involve cross-thread calls. In one embodiment, calls from the browser frame 214 to the content window 202 may be asynchronous. The tab window 212 is then responsible for marshalling the parameters and posting a message to the main window of content window 202. In contrast, calls from the content window 202 to the frame browser 214 may be synchronous. The tab window 212 is then responsible for marshalling the interfaces of the corresponding tab window 212. The tab window 212 may also convert synchronous calls into asynchronous calls in order to reduce the likeliness that a tab will hang.

The tab window 212 may also cache a limited amount of state. This allows the tab window to provide a quick synchronous lookup of state to other components. When the tab window 212 receives an event from the content window 202 that modifies the state, the tab window propagates these events up to the tab window manager 220.

In addition, the tab window 212 exposes several operations that can be performed on a tab, such as destroy, set visibility, set size, set position, and order. The tab window 212 also exposes operations that the frame needs for asynchronously invoking a tab. These operations may be exposed via individual application programming interfaces (API) or through a generic API. For the present quick pick mechanism, each tab window 212 may have its own set of characteristics. For example, one of the tab windows may be a quick pick window which has a different navigation characteristic than other tabbed windows. As will be described and illustrated in FIG. 3-9, the navigation characteristic for the quick pick window may modify a tab row and modify content displayed within a tabbed view of the tabbed browser.

The tab window manager 220 hosts multiple content windows 202 via multiple tab windows 212. The tab window manager 220 manages the overall state of each of the tabs. The state may include: a top level URL; a page title; a back/forward button availability; a favorite icon for the current page, a progress state for the current page, security information reflected in the user-interface (e.g., HTTPs info); and the like. The tab window manager 220 may synchronously query the tab window 212 for per-tab data. In addition, the tab window manager 220 manages the operations performed on the tabs, such as open, close, select, move, set size, set position, set order, and the like. This is achieved by accessing the operations exposed via the tab window 212.

The browser frame 214 hosts the navigation bar 216, frame command bar 218, tab window manager 220, and the tab UI 222. The browser frame 214 may also directly or indirectly host a rebar control (not shown). The browser frame 214 brokers communication between these hosted components.

The tab UI 222 is configured to render the user-interface for the collection of tab windows 212. As will be described later in conjunction with FIGS. 3-9, the Tab UI 222 may provide a quick pick user-interface for implementing the functionality for the present quick pick mechanism. In addition, the tab UI 222 controls the rectangle for the tabs' browser region. Tab UI 222 receives events from tab window manager 220 via browser frame 214. The events pertain to the tabs being managed by tab window manager 220. The events include an "OnTabListChanged" event, an "OnTabChanged" event, and the like. The "OnTabListChanged" event is sent by tab window manager 220 when changes are made to a collection of tabs (e.g., Open, Close, Reorder, etc). The "OnTabChanged" event is sent by tab window manager 220 when a single tab changes (e.g., progress, title, URL). The corresponding tab window 212 sends a notification to tab window manager 220 which forwards the notification to tab UI 222. The notification identifies the tab. This method of communication keeps the communication serialized. In an alternate embodiment, individual tab windows 212 may directly call into tab UI 222. In addition, there may be multiple tab UI 222 components, each one handling the same set of tabs, but for a different location on the user-interface. For example, one tab UI may handle a tab row along the top of the display and another tab UI may handle a tab listview along the side of the display.

The frame command bar 218 provides a set of commands that have been determined to be the most useful. By having this set of commands readily available for any tab, a user can conveniently locate one of the commands for any tab.

Exemplary User-Interface

Figure 3:
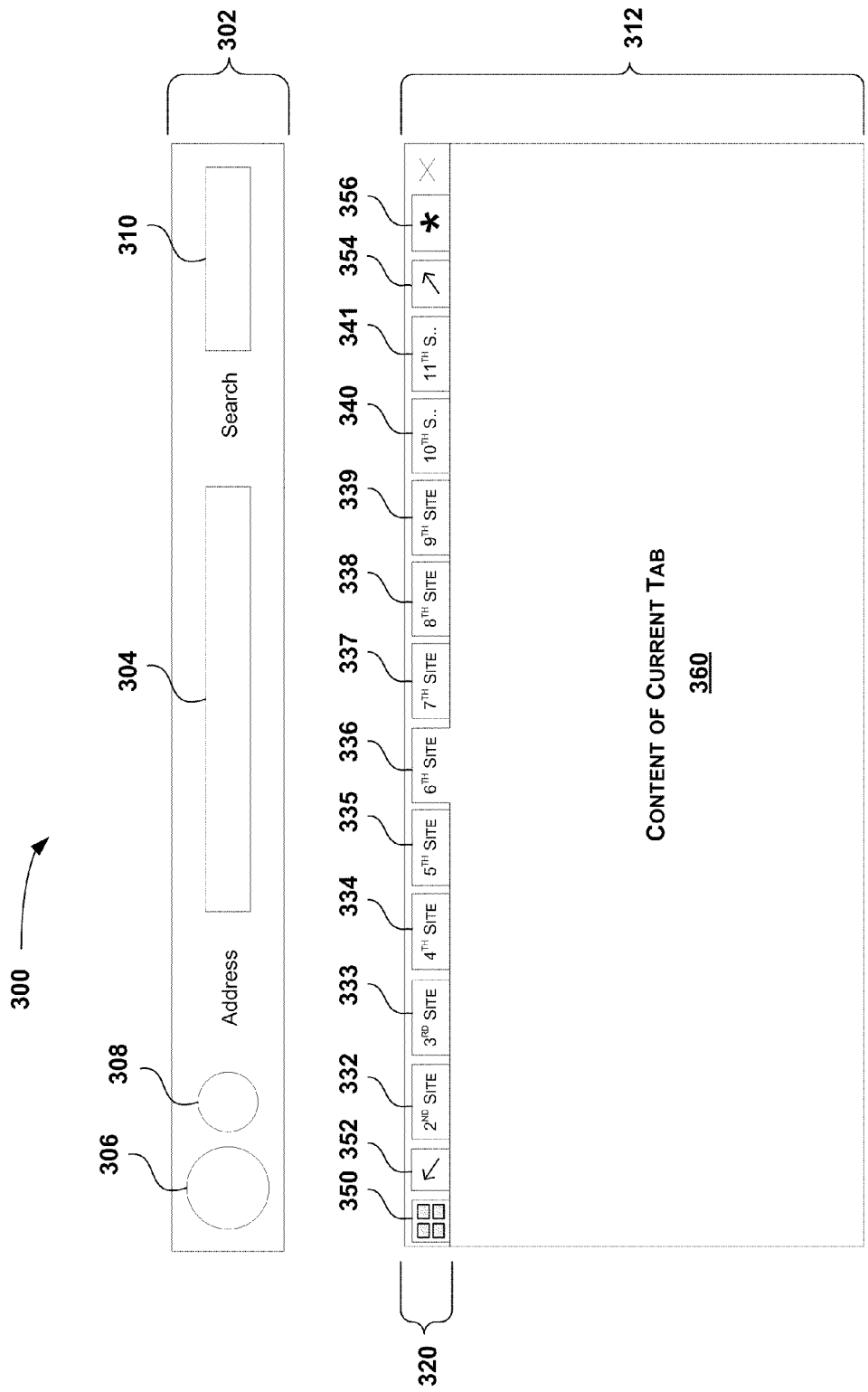
FIG. 3 is a display illustrating one embodiment of a user-interface that supports the quick pick mechanism in a tabbed browser.

FIG. 3 is a display illustrating one embodiment of a user-interface that supports the quick pick mechanism in a tabbed browser. User-interface 300 illustrates salient portions of a tabbed browser that implements the present quick pick mechanism. Those skilled in the art will appreciate that optional third party toolbars (not shown), a page space control (not shown), a status bar (not shown) and/or custom bars (not shown) may also be included within user-interface 300 without departing from the present quick pick mechanism. As shown, user-interface 300 includes a navigation bar 302 and a tabbed window 312.

The tabbed window 312 includes, a tab band or tab row 320, one or more tabs (e.g., tabs 332-342), and content 360 associated with the tab currently in focus (e.g., tab 336 shown in FIG. 3). In addition, tabbed window 312 may include a new tab 356 for creating a new tab within the tabbed window 312. As additional tabs are opened, the visible portion of each tab is reduced to accommodate the additional tabs. Once there is inefficient space for an additional tab, some of the tabs are visually removed from the tabbed window 312. However, visually removed tabs are still maintained as tab windows (tab window 212) and are managed by the tab window manager 220 shown in FIG. 2. The visually removed tabs may be accessed by clicking either a left or right overflow indicator 352 and 354, respectively. The left and right overflow indicator 352 and 354 appear within the tabbed window 312 when one or more of the open tabs are visually removed from the tab row 320. When there are a limited number of open tabs (e.g., four tabs), the text within each tab may be sufficient to distinguish between the tabs, however once a user has opened several tabs, it is difficult to distinguish among the several open tabs because the text associated with each tab is reduced and some of the tabs may not even be visible. For illustrative purposes, the present example displays the text for the title of each tab using its original order (e.g., $1^{st}$) appended with "Site". As one can see, as more tabs are opened, titles for certain tabs (e.g., tabs 340 and 341) display limited useful information about the content of the associated open tab.

In accordance with the present quick pick mechanism, the tabbed browser provides a mechanism for accessing a quick pick user interface. The mechanism may be a quick pick button 350, a context menu selection (not shown), and/or the like on the user-interface 300. The mechanism may also be a hot key (not shown) entered through a keyboard. A user may select the quick pick button 350 to access the quick pick user interface.

The navigation bar 302 may include an address bar 304, a back button 306, a forward button 308, and a search box 310. The content of the address bar 304 may be maintained for each tab. Thus, when "clicking" through the tabs 332-341 the address bar 304 may display the address for the currently selected tab (i.e., the tab in focus). The search box 310 allows text to be entered and searched for in the currently selected tab.

In one embodiment, items in the user-interface 300 that are per frame include the navigation bar 302 and the tab band 320. Items in the user-interface 300 that are per tab include content 360. In one embodiment, content 360 may include different type of data sources. For example, content 360 may be a web page, a shell folder, a navigation based application, and the like. This heterogeneous content may be hosted in a single frame. In another embodiment, the content 360 associated with each tab may all be web pages.

Figure 4:
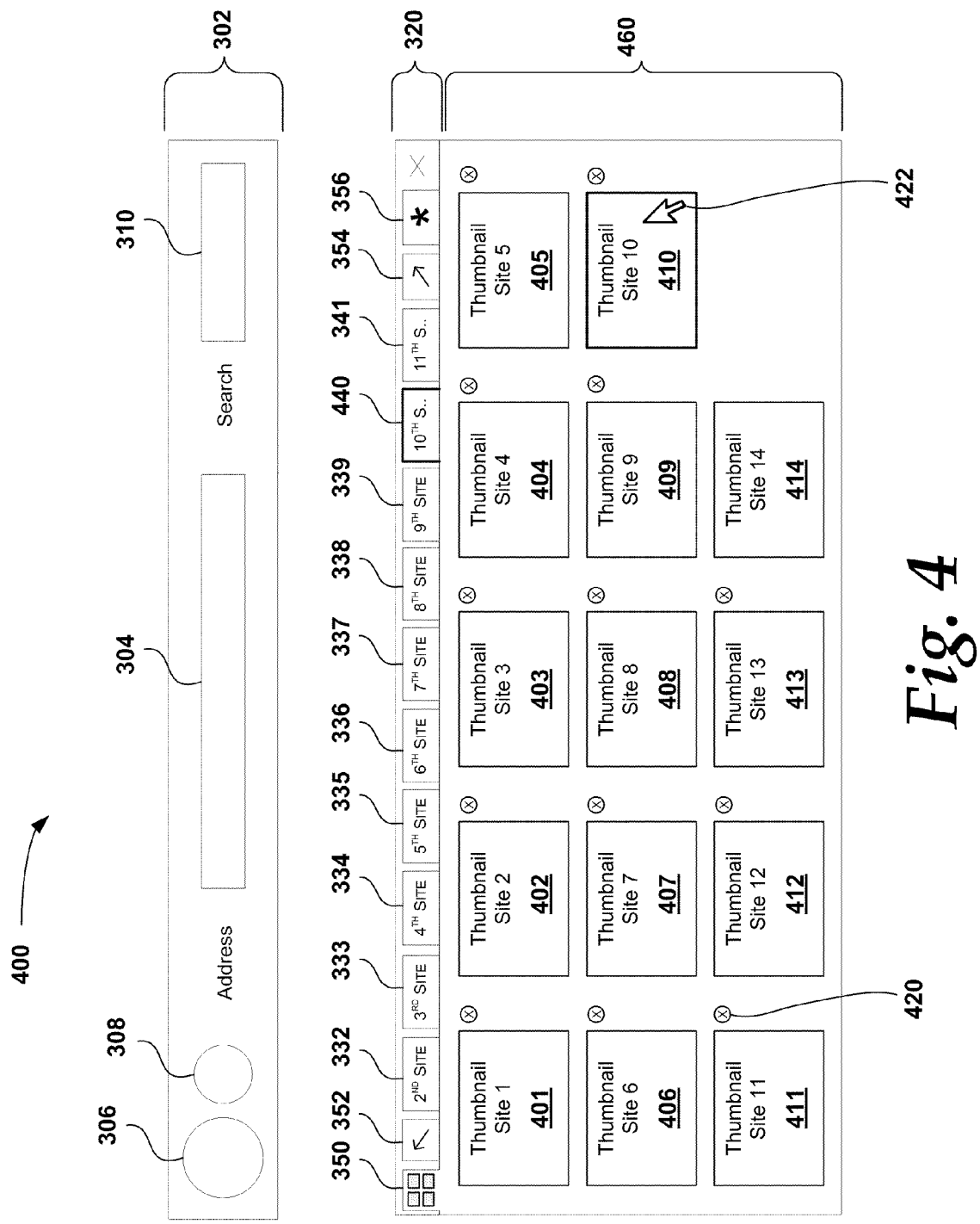
FIG. 4 is a display illustrating one embodiment for the quick pick user-interface and illustrating a user's selection within the interface.

FIG. 4 is a display illustrating one embodiment for the quick pick user-interface and illustrating a user's selection within the interface. Quick pick user-interface 400 illustrates navigation bar 302 as described above and a quick pick window 460. The quick pick window 460 displays a rich set information, such as a graphical representation (e.g., thumbnails 402-411) for each of the open tabs in the tab row 320, a graphical representation (e.g., thumbnails 401, 412-414) of the open tabs that are not currently visible in the tab row because they are in the overflow. The tabbed browser scales the thumbnails so that the content of each tab can be viewed in the quick pick window 460. In the example, thumbnails 401-405 are displayed consecutively on a top row, thumbnails 406-410 are displayed consecutively on a middle row, and thumbnails 411-414 are displayed consecutively on a bottom row. The thumbnails for each of the open tabs are readily available in memory, thus displaying quick pick window 460 provides an efficient means for distinguishing the open tabs. In certain situations, if the user has opened a significant number of tabs, the quick pick window 460 may display further scaled down thumbnails, a pre-determined number of tabs, or the like.

Each thumbnail may include a close indicator (e.g., close indicator 420). If a user selects close indicator 420, the corresponding thumbnail (e.g., thumbnail 411) is removed from the quick pick window 460 and its associated tab (e.g., tab 341) is removed from the tab row 320. In addition, the rich set of information may include a page title or other adornment for each item in the quick pick window 460. When a user hovers a pointer (e.g., pointer 422) over one of the thumbnails (e.g., thumbnail 410), the thumbnail 410 may visually change appearance, such as changing its color. In addition, the tab (tab 440) associated with the hovered thumbnail 410 may change its appearance, such as changing color, bolding text, and the like. The user may select any one of the thumbnails to view its corresponding content in the tabbed window.

Figure 5:
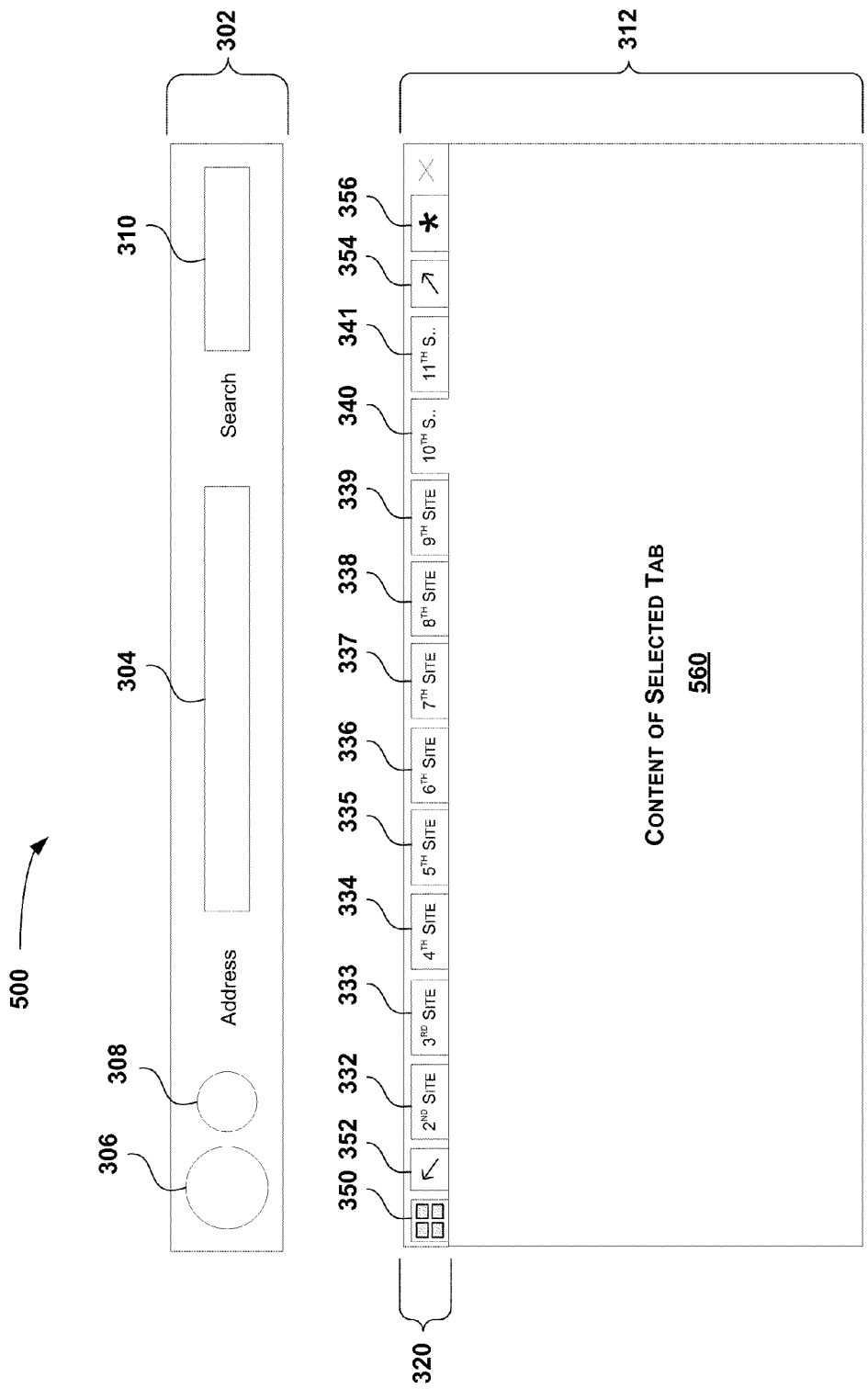
FIG. 5 is a display illustrating the tabbed window after the user's action within the quick pick user-interface shown in FIG. 4.

FIG. 5 is a display illustrating the tabbed window after the user's action within the quick pick user-interface shown in FIG. 4. In this example, the user selected thumbnail 410 in the quick pick user-interface shown in FIG. 4. Thus, the tabbed window displays the tab (i.e., tab 340) associated with thumbnail 410 as the in focus tab. Content of the in focus tab is displayed as the content 560 in the tabbed window 312.

Figure 6:
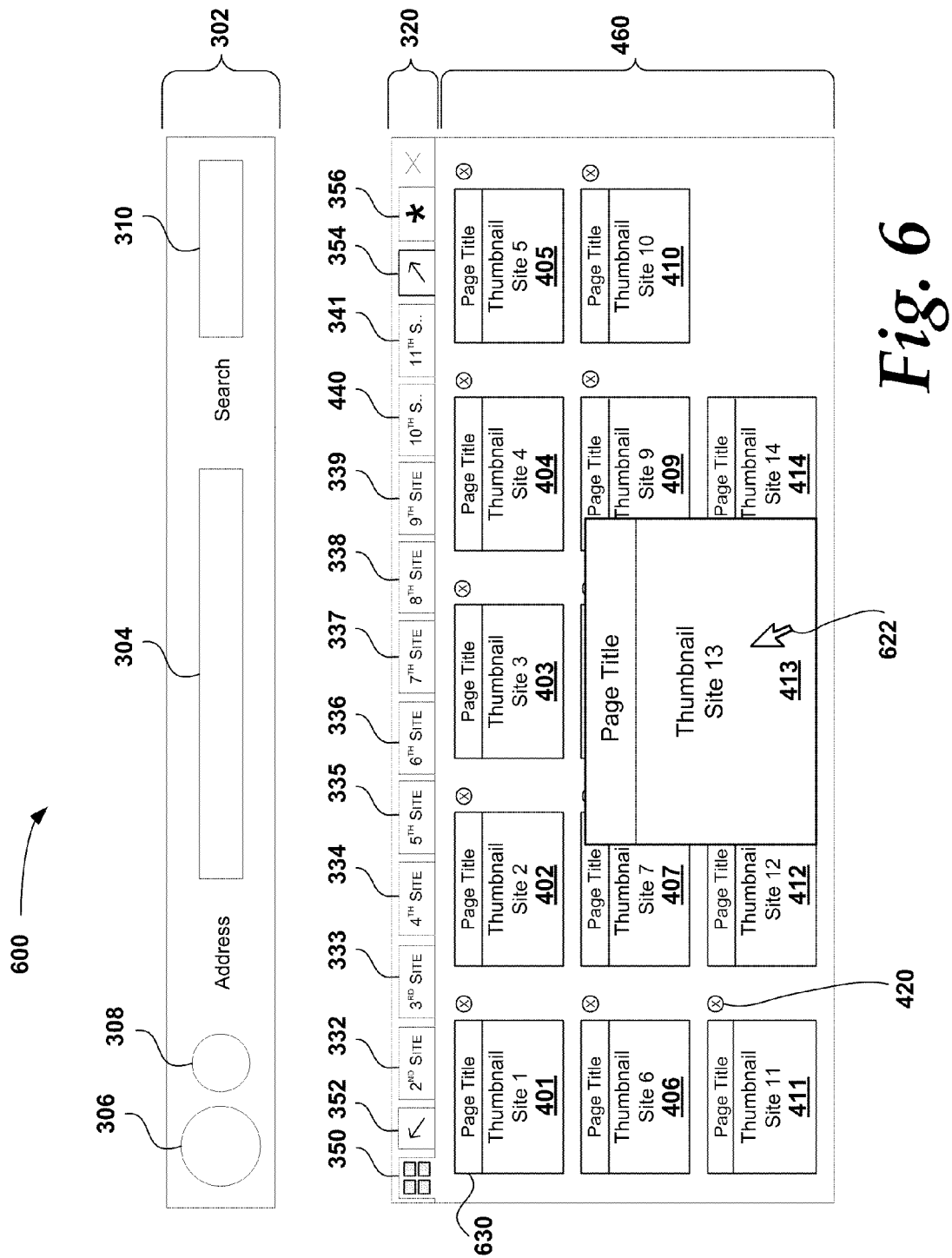
FIG. 6 is a display illustrating the quick pick user-interface and illustrating another user's selection within the interface.

FIG. 6 is a display illustrating the quick pick user-interface and illustrating another user's selection within the interface. This display is similar to FIG. 4 except that in FIG. 6 the user selects thumbnail 413. Because the tab associated with thumbnail 413 is not currently visible in the tab row 320, the right overflow indicator 354 may visually change appearance so that the user may easily identify the relative location for the associated tab in the tab row 320. In another embodiment, when the user hovers over a thumbnail (e.g., thumbnail 413), the thumbnail may enlarge so that the user can more easily view the content associated with the open tab. A page title (e.g., page title 630) or other adornment may be associated with each thumbnail. This provides additional information to the user in helping the user select one of the open tabs.

Figure 7:
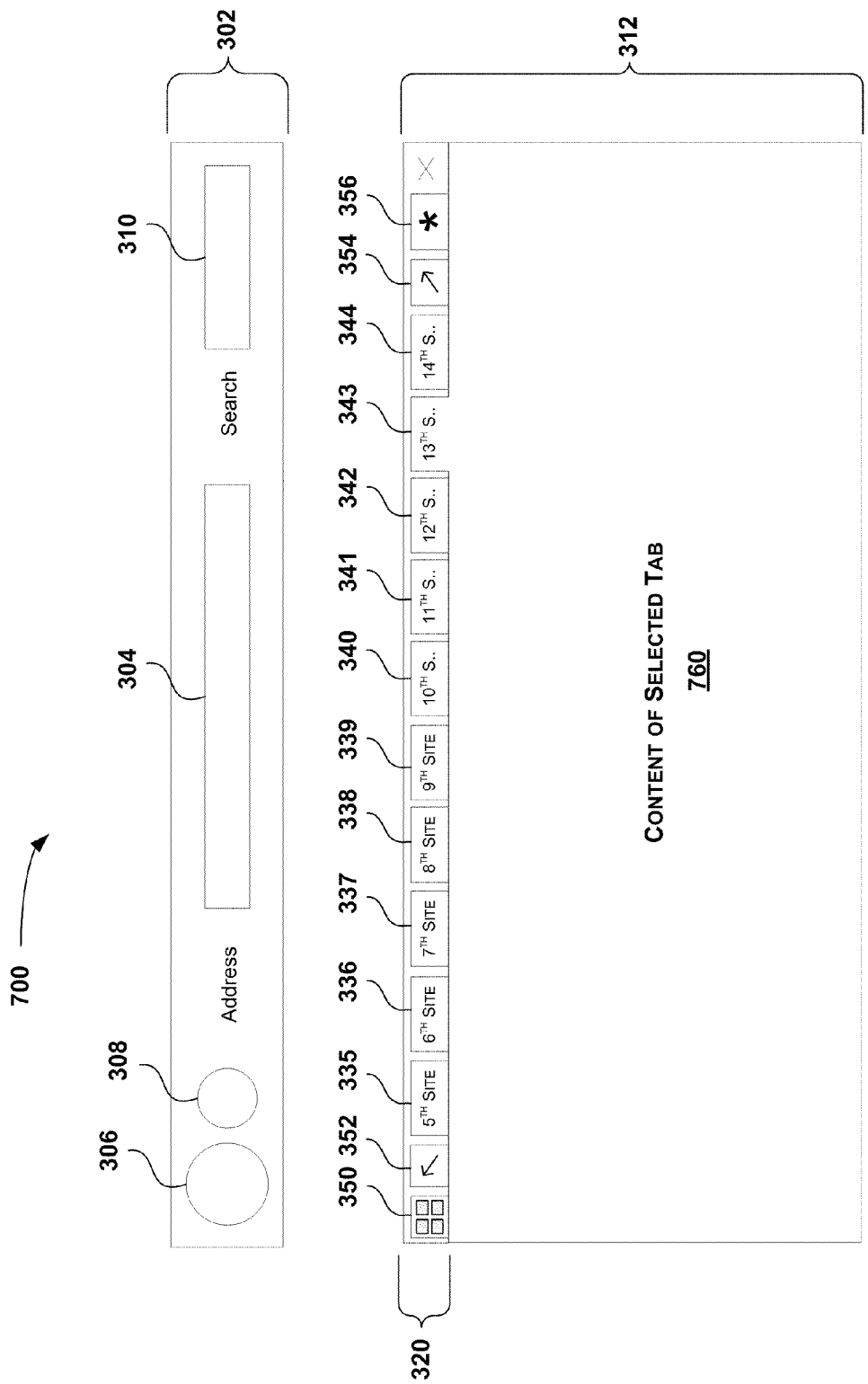
FIG. 7 is a display illustrating the tabbed window after the user's action within the quick pick user-interface shown in FIG. 6.

FIG. 7 is a display illustrating the tabbed window after the user's action within the quick pick user-interface shown in FIG. 6. As described above, the user selected thumbnail 413 in the quick pick user-interface. Thus, the tabbed window displays the tab (i.e., tab 343) associated with thumbnail 413 as the in focus tab. Content of the in focus tab is displayed as the content 760 in the tabbed window 312. It is important to note that for this selection, the tabs displayed within the tab row 320 have been re-positioned so that the selected tab (i.e., tab 343) is in a favorable position within the visible tabs. Thus, tabs 332-334 (shown in FIG. 5) have been visually removed and are now accessible by clicking on the left overflow indicator 352. Likewise, tabs 342-344 which were previously in the overflow in FIG. 5, now appear in the tab row 320. In essence, the tabbed browser attempts to intelligently slide the tabs in the tab row based on the item selected in the quick pick user interface.

Figure 8:
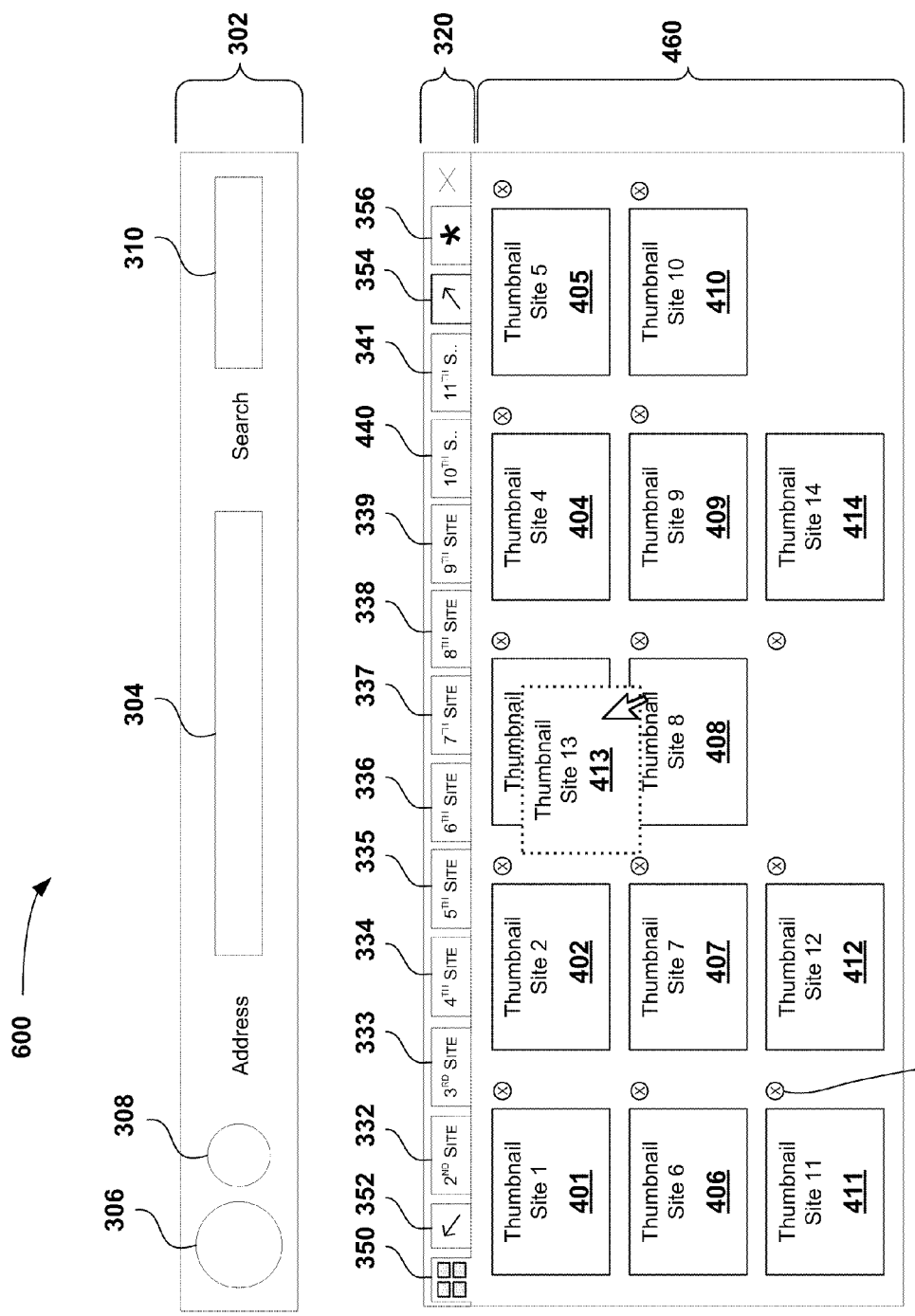
FIG. 8 is a display illustrating the quick pick user-interface and illustrating a user re-positioning a thumbnail within the interface.

FIG. 8 is a display illustrating the quick pick user-interface and illustrating a user re-positioning a thumbnail within the interface. Again this display is identical to FIG. 4 except that in FIG. 8 the user is performing a drag-drop operation within the quick pick user interface. Thumbnail 413 is being re-positioned from the second to last position in the bottom row to the third position in the top row. After the drag-drop operation, thumbnail 413 will be between thumbnail 402 and thumbnail 403 on the top row.

Figure 9:
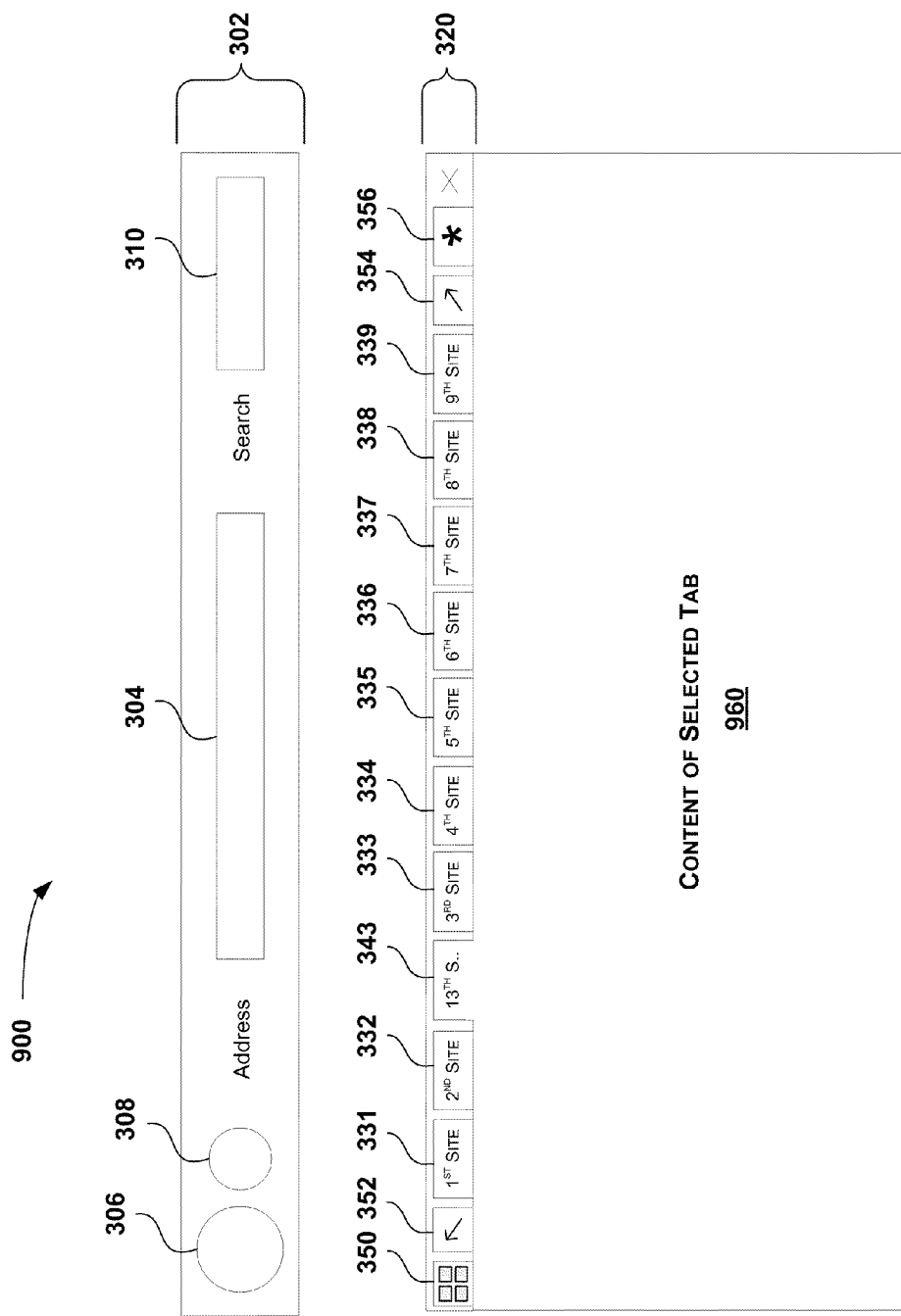
FIG. 9 is a display illustrating the tabbed window after the user's action within the quick pick user-interface shown in FIG. 8.

FIG. 9 is a display illustrating the tabbed window after the user's action within the quick pick user-interface shown in FIG. 8. In FIG. 8, after moving thumbnail 413, the user selected thumbnail 413 for viewing. As one can see, the tabs within the tab row 320 shown in FIG. 9 have been re-positioned so that the tab (i.e., tab 343) associated with thumbnail 413 is positioned between tab 332 and 333 associated with thumbnails 402 and 403, respectively. In addition, tab 331 which was previously in the overflow has been included in the tab row 320 and tabs 440 and 441 have been removed from the tab row and are now in the overflow. This allows the selected tab 343 to have a more favorable position than if tab 331 remained in the overflow. In one embodiment, the most favorable position may be the center tab in the tab row. Alternatively, the most favorable position may be the left most tab in the tab row. This most favorable position may be user-definable.

Exemplary Operation

Figure 10:
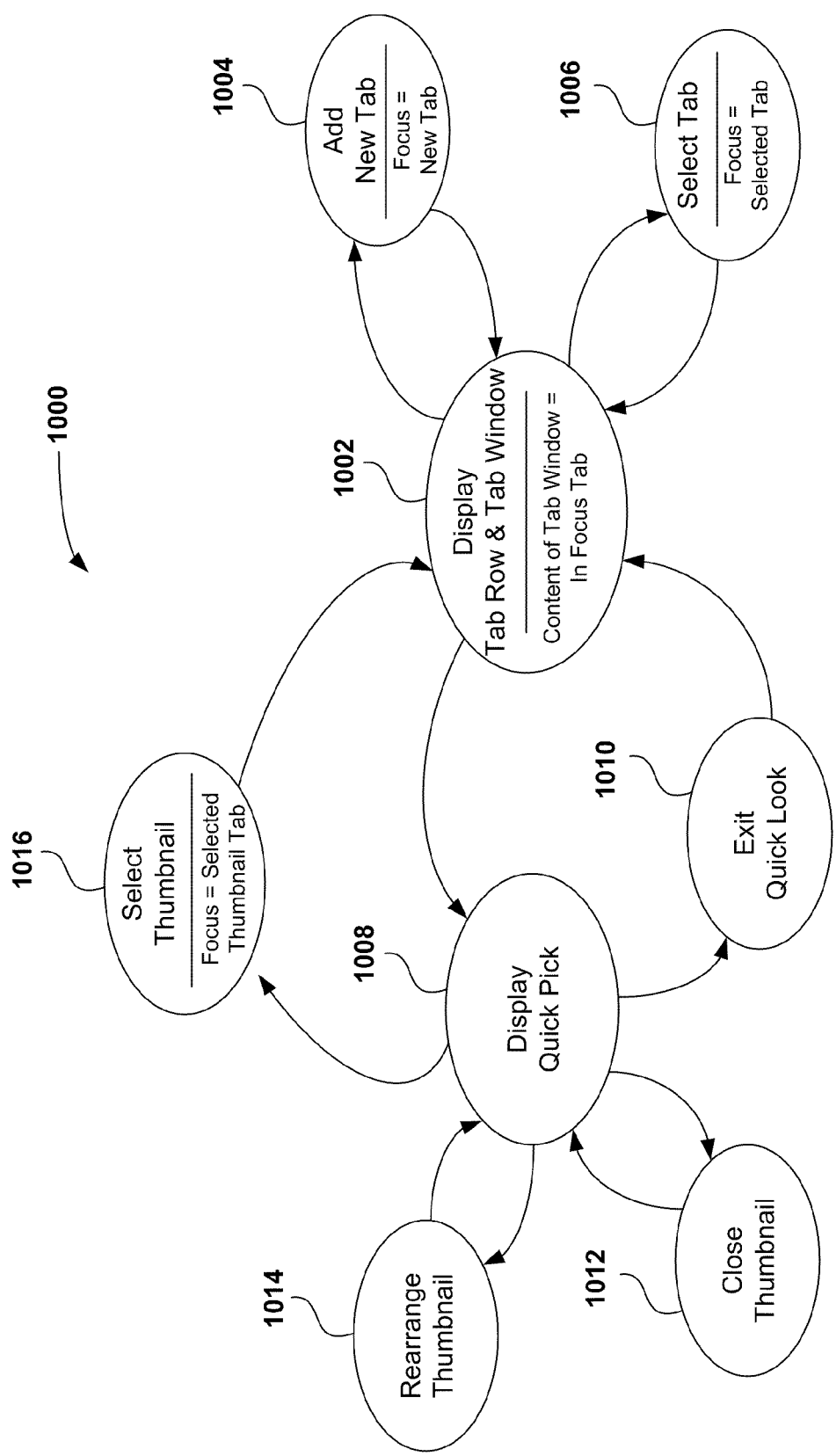
FIG. 10 is an operational state diagram generally illustrating the processing for managing open tabs and selecting one out of a large set of open tabs within a tabbed browser using the present quick pick feature.

FIG. 10 is an operational state diagram 1000 generally illustrating the processing for managing and selecting one out of a large set of open tabs within a tabbed browser using the present quick pick feature. The processing may be implemented on a computing device, such as computing device 100. The processing may be implemented within operating system 106, as one or more program modules 108, or in a combination of the two. For illustration purposes, the processing is illustrated and described as different transitions from different states. However, several flow diagrams may have been used to illustrate all the processing occurring within state diagram 1000. At state 1002, the tabbed browser displays a tabbed window that includes a tab row and contents of the currently in focus tab. From state 1002, several transitions may occur.

State 1004 may occur from state 1002. At state 1004, the tabbed browser adds a new tab and changes the in focus tab to the new tab. In addition, the tabbed browser may visually remove some of the tabs displayed on the tab row if the addition of the new tab makes the number of tabs in the tab row more than a pre-determined number. After the new tab is added, the state transitions back to state 1002.

State 1006 may occur from state 1002. At state 1006, the tabbed browser responds to the user's selection of a tab or overflow indicator. The tabbed browser adjusts the in focus tab and adjusts the tabs that are displayed on the tab row accordingly. After the tabbed browser handles the user's selection, the state transitions back to state 1002.

State 1008 may occur from state 1002. State 1008 is responsible for handling the present quick pick mechanism. From state 1008, several transitions may occur.

State 1010 may occur from state 1008. State 1010 exits the quick pick mechanism, such as via a close button on the quick pick user interface. From state 1008, the tabbed browser transitions back to state 1002.

State 1012 may occur from state 1008. At state 1012, the tabbed browser closes a thumbnail in response to a user's action within the quick pick user interface. For example, the user may have selected a close button 420 within the quick pick user interface. Upon closing the thumbnail, the tabbed browser may also perform other operations associated with closing the thumbnail, such as removing the associated tab from the tab row, deleting the associated tab window, and informing the tab window manager that the associated tab window is no longer open. After the tabbed browser handles closing the thumbnail, the state transitions back to state 1008.

State 1014 may occur from state 1008. At state 1014, the tabbed browser may rearrange the thumbnails in response to a user's action within the quick pick user interface. For example, the user may have selected one of the thumbnails, dragged it to another location, and dropped it next to different thumbnails. The tab browser will change the order of the thumbnails displayed in the quick pick user interface. In addition, the tab browser will change the order of the tabs within the tab row to reflect the re-positioned thumbnail. After the tabbed browser handles the re-arranging of the thumbnails, the state transitions back to state 1008.

State 1016 may occur from state 1008. At state 1016, the tabbed browser may perform operations in response to the user's selection of one of the thumbnails displayed in the quick pick user interface. For example, the tabbed browser may set the in focus tab to be the tab associated with the selected thumbnail. In addition, the tabbed browser may intelligently slide the tabs within the tab row so that the selected thumbnail is displayed in a favorable position. For example, if the selected thumbnail corresponds to a tab in the overflow on the left side of the tab row, each tab in the tab row may move to the right until there are not any more items in the overflow on the left. Alternatively, each tab in the tab row may move to the right until the selected item moves to a favorable position on the tab row, such as in the center. Likewise, if the selected thumbnail corresponds to a tab in the overflow on the right side of the tab row, each tab in the tab row may move to the left until there are not any more items in the overflow on the right. Alternatively, each tab in the tab row may move to the left until the selected item moves to a favorable position on the tab row. The favorable position may be user definable. Once the tabbed browser handles the processing based on the selected thumbnail, the state transitions to back to state 1002.

As one can see, the present quick pick mechanism allows a user to conveniently select any one of several open tabs. They can easily view each open tab, rearrange the tabs, close a tab, and the like. Thus, the present quick pick mechanism provides an enhanced and convenient viewing experience to users.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the present mechanism may be practiced without one or more of the specific details, or with other methods, resources, materials, etc. In other instances, well known structures, resources, or operations have not been shown or described in detail merely to avoid obscuring aspects of the present consistent visual appearance technique.

While example embodiments and applications have been illustrated and described, it is to be understood that the present technique is not limited to the precise configuration and resources described above. Various modifications, changes, and variations apparent to those skilled in the art may be made in the arrangement, operation, and details of technique disclosed herein without departing from the scope of the claimed invention.

What is claimed is:

1. A computer-implemented method for navigating content, the method comprising:
    displaying a web browser within a window of a display, the web browser window displaying a plurality of open tabs within a tab band, each open tab having separate web page content associated therewith, wherein the plurality of open tabs includes a plurality of visible tabs and a plurality of overflow tabs that are not currently visible in the tab band, and wherein one of the visible tabs comprises a currently selected tab
    displaying a quick pick window on the display in response to user activation of a single quick pick mechanism, the quick pick window displaying a set of graphical views representing web page content for each of the plurality of open tabs within the tab band, wherein each graphical view is scaled so that the web page content for each open tab is displayed within the quick pick window;

receiving user input within the quick pick window selecting a graphical view corresponding to one of the overflow tabs; and in response to receiving the user input selecting the graphical view:
- removing the quick pick window from the display;
- setting the currently selected tab to be the open tab associated with the selected graphical view; and
- adjusting the open tabs within the tab band so that the currently selected tab is made a visible tab.

2. The computer-implemented method of claim 1 wherein the quick pick window substantially obscures an entirety of the web page content associated with the currently selected tab without obscuring the tab band within the web browser window.

3. The computer-implemented method of claim 1 wherein:
- the quick pick mechanism comprises a button positioned within the tab band; and
- the quick pick window is displayed in place of the web page content associated with the currently selected tab.

4. The computer-implemented method of claim 1 wherein:
- the quick pick mechanism comprises a tab positioned within the tab band; and
- the quick pick window is displayed as the web page content associated with the quick pick mechanism tab.

5. A computer-implemented method for navigating content within a web browser window comprising a tab band displaying a plurality of open tabs, wherein each open tab includes separate web page content associated therewith and wherein the plurality of open tabs includes a currently selected tab and one or more non-selected tabs, the web browser window further displaying the web page content associated with the currently selected tab, the method comprising:
- displaying a quick pick window on the display in response to user activation of a single quick pick mechanism, wherein the quick pick window substantially obscures an entirety of the web page content associated with the currently selected tab without obscuring the tab band within the web browser window, the quick pick window simultaneously displaying a plurality of scaled thumbnails representing web page content for each of the plurality of open tabs within the tab band;
- receiving user input within the quick pick window; and
- modifying the quick pick window based on the user input.

6. The computer-implemented method of claim 5 wherein the quick pick mechanism comprises one of a context menu selection, a hot key, or a button on a user interface of the web browser window.

7. The computer-implemented method of claim 5 wherein:
- the quick pick mechanism comprises a button positioned within the tab band; and
- the quick pick window is displayed in place of the web page content associated with the currently selected tab.

8. The computer-implemented method of claim 5 wherein:
- the quick pick mechanism comprises a tab positioned within the tab band; and
- the quick pick window is displayed as the web page content associated with the quick pick mechanism tab.

9. The computer-implemented method of claim 5 wherein the step of receiving user input within the quick pick window comprises selecting one of the thumbnails, and the step of modifying the quick pick window comprises removing the quick pick window from the display, said method further comprising:
- setting the currently selected tab in the tab band to be the open tab corresponding to the selected thumbnail.

10. The computer-implemented method of claim 9 wherein:
- the plurality of open tabs within the tab band includes a plurality of visible tabs and a plurality of overflow tabs that are not currently visible within the tab band;
- the step of receiving user input within the quick pick window further comprises selecting a thumbnail corresponding to one of the overflow tabs that is not currently visible within the tab band; and
- the step of setting the currently selected tab in the tab band to be the open tab corresponding to the selected thumbnail further comprises adjusting the open tabs within the tab band so that the currently selected tab is made a visible tab.

11. The computer-implemented method of claim 5 wherein the step of receiving user input within the quick pick window comprises selecting a close indicator associated with one of the thumbnails, and the step of modifying the quick pick window comprises closing said one thumbnail so that the thumbnail is no longer displayed within the quick pick window, said method further comprising:
- removing from the tab band the open tab corresponding to the closed thumbnail.

12. The computer-implemented method of claim 5 wherein the step of receiving user input within the quick pick window comprises performing a drag-and-drop operation on one of the thumbnails, and the step of modifying the quick pick window comprises repositioning said one thumbnail based on where the thumbnail is dropped within the quick pick window, said method further comprising:
- adjusting the open tabs within the tab band to reposition the open tab corresponding to the repositioned thumbnail.

13. The computer-implemented method of claim 5 wherein the step of receiving user input within the quick pick window comprises positioning a pointer over one of the thumbnails, and the step of modifying the quick pick window comprises visually enlarging said one thumbnail while the pointer remains positioned over the thumbnail.

14. A computer system configured to navigate content, the system comprising:
- at least one processor configured to execute computer readable instructions; and
- at least one computer readable storage medium storing computer readable instructions that when executed by the at least one processor perform a method comprising:
  - displaying a web browser within a window of a display, the web browser window comprising a tab band displaying a plurality of open tabs, wherein each open tab includes separate web page content associated therewith and wherein the plurality of open tabs includes a currently selected tab and one or more non-selected tabs, the web browser window further displaying the web page content associated with the currently selected tab;
  - displaying a quick pick window in response to user activation of a single quick pick mechanism, the quick pick window simultaneously displaying a plurality of scaled thumbnails representing web page content for each of the plurality of open tabs within the tab band;
  - receiving first user input within the quick pick window;
  - modifying both the quick pick window and the tab band based on the first user input;
  - receiving second user input within the quick pick window selecting one of the thumbnails; and
  - in response to receiving the second user input selecting the thumbnail:
    - removing the display of the quick pick window; and setting the currently selected tab in the tab band to be the open tab corresponding to the selected thumbnail.

15. The computer system of claim 14 wherein the quick pick window is positioned on the display to substantially obscure an entirety of the web page content associated with the currently selected tab without obscuring the tab band.

16. The computer system of claim 14 wherein:
the plurality of open tabs within the tab band includes a plurality of visible tabs and a plurality of overflow tabs that are not currently visible within the tab band;
the step of receiving second user input within the quick pick window further comprises selecting a thumbnail corresponding to one of the overflow tabs that is not currently visible within the tab band; and
the step of setting the currently selected tab in the tab band to be the open tab corresponding to the selected thumbnail further comprises adjusting the open tabs within the tab band so that the currently selected tab is made a visible tab.

17. The computer system of claim 14 wherein the step of receiving first user input within the quick pick window comprises selecting a close indicator associated with one of the thumbnails, the step of modifying the quick pick window comprises closing said one thumbnail so that the thumbnail is no longer displayed within the quick pick window, and the step of modifying the tab band comprises removing from the tab band the open tab corresponding to the closed thumbnail.

18. The computer system of claim 14 wherein the step of receiving first user input within the quick pick window comprises performing a drag-and-drop operation on one of the thumbnails, the step of modifying the quick pick window comprises repositioning said one thumbnail based on where the thumbnail is dropped within the quick pick window, and the step of modifying the tab band comprises adjusting the open tabs within the tab band to reposition the open tab corresponding to the repositioned thumbnail.

19. The computer system of claim 14 wherein the step of receiving first user input within the quick pick window comprises positioning a pointer over one of the thumbnails, the step of modifying the quick pick window comprises visually enlarging said one thumbnail while the pointer remains positioned over the thumbnail, and the step of modifying the tab band comprises changing the appearance of the tab corresponding to the enlarged thumbnail.

20. The computer system of claim 14 wherein the quick pick mechanism comprises one of a context menu selection, a hot key, or a button on a user interface of the web browser window.

* * * * *